United States Patent
McHugh, IV et al.

(10) Patent No.: US 11,938,358 B2
(45) Date of Patent: Mar. 26, 2024

(54) VALVE SYSTEM AND METHOD FOR VENTING AND MEASURING A GAS CONTENT OF A FIRE SUPPRESSION SYSTEM

(71) Applicant: AGF Manufacturing, Inc., Malvern, PA (US)

(72) Inventors: George J. McHugh, IV, Malvern, PA (US); James P. McHugh, Newtown Square, PA (US); Bentley F. Gleeson, Plymouth Meeting, PA (US)

(73) Assignee: AGF MANUFACTURING, INC., Malvern, PA (US)

( * ) Notice: Subject to any disclaimer, the term of this patent is extended or adjusted under 35 U.S.C. 154(b) by 448 days.

(21) Appl. No.: 17/120,901

(22) Filed: Dec. 14, 2020

(65) Prior Publication Data

US 2021/0093907 A1     Apr. 1, 2021

Related U.S. Application Data

(62) Division of application No. 15/704,512, filed on Sep. 14, 2017, now Pat. No. 10,881,887.

(51) Int. Cl.
    *A62C 35/68*        (2006.01)
    *A62C 35/62*        (2006.01)
    (Continued)

(52) U.S. Cl.
    CPC .............. *A62C 35/68* (2013.01); *A62C 35/62* (2013.01); *A62C 35/645* (2013.01);
    (Continued)

(58) Field of Classification Search
CPC ....... A62C 35/62; A62C 35/68; A62C 35/645; G05D 7/0635; G05D 11/135
See application file for complete search history.

(56) References Cited

U.S. PATENT DOCUMENTS

| 5,290,009 A | 3/1994 | Heilmann |
| 9,144,700 B2 | 9/2015 | Burkhart et al. |

(Continued)

FOREIGN PATENT DOCUMENTS

EP     1988385 A1     11/2008

OTHER PUBLICATIONS

"Collectandrain, Model 5300A", AGF Manufacturing Inc., retrieved on Sep. 14, 2017, 2 pages, http://www.testandrain.com/downloads/pdf/SellSheetM5300.pdf.

(Continued)

*Primary Examiner* — Tuongminh N Pham
(74) *Attorney, Agent, or Firm* — Panitch Schwarze Belisario & Nadel LLP

(57) ABSTRACT

A valve assembly includes a pipe fitting through which a gas is configured to flow. The inlet of the pipe fitting is configured to connect to an open port of a fire suppression sprinkler system so that gas flows from the fire suppression sprinkler system into the pipe fitting. The valve assembly also includes a vent valve. The inlet of the vent valve is connected to the outlet of the pipe fitting. The vent valve is operable to move between an open position and a shut position. The valve assembly includes an inert gas analyzer and at least one vent port upstream of the inert gas analyzer. The inert gas analyzer is positioned to measure the inert gas content of gas flowing in front of the inert gas analyzer and through the vent port to an outside environment.

12 Claims, 7 Drawing Sheets

(51) Int. Cl.
*A62C 35/64* (2006.01)
*G05D 7/06* (2006.01)
*G05D 11/13* (2006.01)
*G08B 21/18* (2006.01)

(52) U.S. Cl.
CPC ......... *G05D 7/0635* (2013.01); *G05D 11/135* (2013.01); *G08B 21/182* (2013.01)

(56) References Cited

U.S. PATENT DOCUMENTS

| | | |
|---|---|---|
| 2010/0263882 A1 | 10/2010 | Bodemann |
| 2011/0094758 A1 | 4/2011 | Burkhart et al. |
| 2011/0226495 A1* | 9/2011 | Burkhart ................ A62C 35/60 137/589 |
| 2013/0333764 A1* | 12/2013 | Wright .................. E03C 1/0408 137/551 |
| 2015/0034170 A1* | 2/2015 | Kochelek ............... F16L 45/00 137/15.04 |
| 2015/0151151 A1* | 6/2015 | Bodemann ............. A62C 35/60 137/15.04 |
| 2016/0129291 A1 | 5/2016 | Bodemann |
| 2018/0064976 A1 | 3/2018 | Kochelek et al. |
| 2019/0076683 A1 | 3/2019 | Mchugh et al. |

OTHER PUBLICATIONS

"Handi N2 Analyzer", Premier O2 Solutions, Maxtec, Inc., retrieved on Sep. 14, 2017, 1 page, https://www.maxtec.com/wp-content/uploads/2014/11/handiN2DataSheet-f.pdf.

"Max N2+Nitrogen Analyzers", Maxtec, Inc., retrieved on Sep. 14, 2017, 2 pages, https://cdn.maxtec.com/product-docs/maxn2-plus-nitrogen-datasheet.pdf.

"Remote Inspector's Test for Single Story and Other Applications Including Systems Requiring Pressure Relief Valve, Model 3011", AGF Manufacturing Inc., retrieved on Sep. 14, 2017, 2 pages, http://www.vikingcorp.com/sites/default/files/usrelated/agf/m3011.pdf.

"Standard for the Installation of Sprinkler Systems", NFPA 13, 2016, 495 pages.

Office Action dated Aug. 19, 2019, by the Canadian Intellectual Property Office in corresponding Canadian Patent Application No. 3,017,309, 5 pages.

Canadian Examination Report dated Sep. 28, 2022, corresponding to CA 3,123,076 (3 pages).

Canadian Examination Report dated May 12, 2023, corresponding to CA Application No. 3,123,07 (4 Pages).

* cited by examiner

VALVE SYSTEM AND METHOD FOR VENTING AND MEASURING A GAS CONTENT OF A FIRE SUPPRESSION SYSTEM

CROSS-REFERENCES TO RELATED APPLICATIONS

This application is a divisional of U.S. patent application Ser. No. 15/704,512 filed on Sep. 14, 2017, the entire content of which is incorporated herein by reference.

TECHNICAL FIELD

The present disclosure relates to a valve assembly and method for manually venting and measuring gas levels in a piping system. The valve system may be installed in a fire suppression sprinkler system to manually vent gas (e.g., air) from a fire suppression system and to measure a particular gas (e.g., an inert gas such as nitrogen) levels in the fire suppression system.

BACKGROUND

One type of fire suppression system is known as a wet pipe fire suppression sprinkler system. A wet pipe fire suppression sprinkler system deploys a liquid suppression agent (e.g., water) to prevent and/or extinguish a fire. A fire suppression sprinkler system may be installed, for example, in a commercial building or residential dwelling to suppress/extinguish a fire. More specifically, the wet pipe fire suppression sprinkler system may discharge pressurized liquid (e.g., water) via sprinklers or nozzles to prevent and/or extinguish a fire.

Another type of a fire suppression system is known as a dry pipe fire suppression sprinkler system. The pipes of a dry pipe fire suppression sprinkler system are filled with a pressurized gas (e.g., air or nitrogen) instead of water. This pressurized gas holds a remote valve (e.g., a dry pipe valve or check valve) in a closed position. The dry pipe valve prevents water from entering the pipes until a fire is detected, for example, by one or more of the sprinklers. When fire is detected, the pressurized gas is released from one or more sprinkler heads and the fluid suppression agent (e.g., water) enters into the piping system to flow through the open sprinklers onto the fire. Dry pipe fire suppression systems may be particularly useful in spaces where a liquid suppression agent could freeze in the pipes or in areas that are particularly sensitive to the introduction of water (e.g., a sterile laboratory environment).

One variation of a dry pipe fire suppression sprinkler system is known as a pre-action fire suppression sprinkler system. A pre-action fire suppression sprinkler system utilizes a pre-action valve that is electrically operated to prevent water from entering the pipes. The operation of this pre-action valve may be controlled by independent flame, heat, and/or smoke detection. The pre-action fire suppression sprinkler system may suppress a fire through a two-step process: (i) the pre-action valve is electrically operated to introduce water into the piping system; and (ii) one or more sprinkler heads open (e.g., due to increased heat) to permit water to flow onto the fire. By using the pre-action valve, a pre-action fire suppression sprinkler system may provide an added measure of protection against an inadvertent discharge.

One issue that can arise in any fire suppression sprinkler system is deterioration of the piping and/or sprinkler heads due to corrosion. One predominant form of corrosion that fire suppression sprinkling systems are susceptible to is oxygen corrosion. In a dry pipe fire suppression sprinkler system or a pre-action fire suppression sprinkler system, using pressurized air within the piping network may result in increased corrosion because of the oxygen present in the pressurized air (air typically contains approximately 20.95% oxygen). Even in a wet pipe fire suppression sprinkler system, air may be introduced into the system each time the sprinkling system is drained and refilled. This increases the likelihood that oxygen corrosion will occur because of the introduction of a fresh supply of air into the piping network.

The presence of oxygen in the fire suppression sprinkler system can cause corrosion due to oxidation of the metallic piping and/or sprinkler heads. Corrosion deposits may be created, which can partially or fully obstruct the flow path of the suppression agent (e.g., water). Pitting corrosion may also arise potentially leading to leaks in the piping system. Additionally, oxygen can facilitate the growth of microbiological organisms (e.g., bacteria, molds, fungi, etc.) within the piping system, which can impede the flow rate of the suppression agent and cause additional suppression performance problems.

As noted above, some wet, dry, and pre-action fire suppression sprinkler systems may utilize pressurized nitrogen instead of pressurized air. Nitrogen is an inert gas, and so nitrogen may help prevent some of the corrosion concerns that arise with oxygen. Therefore, filling a dry or pre-action fire suppression sprinkler system with nitrogen (or displacing air in a wet suppression system with nitrogen) may beneficially improve the maintenance and performance of the fire suppression sprinkler system. Additionally, nitrogen can be used in conjunction with a wet fire suppression sprinkler system to help prevent corrosion due to trapped air and from dissolved oxygen in the fluid (e.g., water) of the wet fire suppression sprinkler system.

When a fire suppression sprinkler system is depressurized (e.g., during installation or for maintenance), however, air may enter the system. The fire suppression sprinkler system may subsequently (e.g., after the maintenance is complete) be brought back into operation by providing nitrogen into the piping system, for example, from a nitrogen generator or from nitrogen bottles. The residual air (or any other gases inside of the piping system) can be vented while the nitrogen is being supplied to bring the fire suppression sprinkler system back on line (i.e., to become operational again). Nitrogen can be introduced in this manner in any type of fire suppression sprinkler system, though nitrogen may be particularly helpful in preventing corrosion in a dry fire suppression sprinkler system or pre-action fire suppression sprinkler system.

U.S. Pat. No. 9,144,700 describes an automatic technique for introducing nitrogen into a fire protection system. The fire protection system includes a nitrogen generator coupled to the sprinkler system. The nitrogen generator is used to fill the piping system with nitrogen to displace oxygen (e.g., included in air) through automatic vents throughout the piping system. The nitrogen filling system includes sensors to detect the oxygen level in the piping system and to automatically control the amount of nitrogen being supplied to achieve the desired oxygen/nitrogen level.

An automatic nitrogen supplying system such as that disclosed in U.S. Pat. No. 9,144,700, however, is relatively complicated and expensive to install, operate, and maintain. A less complicated, lower-cost valve system and method for venting and measuring a gas content (e.g., oxygen or nitrogen) in a piping system could provide a beneficial alternative to an automatic nitrogen supplying system such as disclosed in this patent.

SUMMARY

The present application relates to a valve assembly and a method suitable for use to vent and measure the nitrogen content of a gas (e.g., a nitrogen and air mixture) within a fire suppression sprinkling system. Inert gasses other than nitrogen could be used.

In one embodiment, the valve assembly includes a pipe fitting through which gas flows. The pipe fitting includes an inlet, a first outlet, and a second outlet. The inlet of the pipe fitting is configured to connect to an open port of a fire suppression sprinkler system so that the gas flows from the fire suppression sprinkler system into the pipe fitting and out through the first and second outlets of the pipe fitting. The valve assembly includes an inert gas analyzer. An inlet of the inert gas analyzer is connected to the first outlet of the pipe fitting. The inert gas analyzer is positioned so that the gas flows in front of the sensor of the inert gas analyzer. The sensor of the inert gas analyzer measures the inert gas content of the gas flowing in front of the inert gas analyzer. The valve assembly includes a vent valve. The inlet of the vent valve is connected to the second outlet of the pipe fitting. The vent valve is operable to move between an open and shut position. The valve assembly includes a discharge orifice connected to outlet of the vent valve. The discharge orifice discharges the gas to the outside environment when the vent valve is in the open position.

In another embodiment, a valve assembly includes a pipe fitting through which gas is configured to flow. The inlet of the pipe fitting is configured to connect to an open port of a fire suppression sprinkler system so that the gas flows from the fire suppression sprinkler system into the pipe fitting and out through the outlet of the pipe fitting. The valve assembly includes a vent valve, which has an inlet and an outlet. The inlet of the vent valve is connected to the outlet of the pipe fitting. The vent valve is operable to move between an open position and a shut position. The valve assembly includes an inert gas analyzer. The inlet of the inert gas analyzer is connected to the outlet of the pipe fitting. The inert gas analyzer includes a sensor which is positioned so that the gas flowing from the first outlet passes in front of the sensor of the inert gas analyzer and is vented to the outside environment through at least one vent port in front of the sensor of the inert gas analyzer. The inert gas analyzer measures the content of the inert gas in the gas flowing in front of the inert gas analyzer.

Another aspect of the disclosure here involves a method for venting gas to the outside environment and measuring the nitrogen content of the gas. The method includes supplying nitrogen into piping of a fire suppression sprinkler system which possesses residual air and opening a vent valve connected to the piping of the fire suppression sprinkler system to allow the gas to flow through the vent valve and to the outside environment. The method includes connecting a nitrogen analyzer to the vent valve via a pipe fitting so that the gas flows in front of the nitrogen analyzer and measuring the nitrogen content of the gas with the nitrogen analyzer when the gas is flowing in front of the nitrogen analyzer. The method includes manually stopping the supply of the nitrogen into the piping of the fire suppression sprinkler system when the measured nitrogen content of the gas is at least a predetermined nitrogen content and closing the vent valve to prevent the gas from flowing through the vent valve to the outside environment when the measured nitrogen content of the gas is at least the predetermined nitrogen content.

DETAILED DESCRIPTION

The valve systems and assemblies described herein can provide a way of venting a gas (e.g., air, inert gas (e.g., nitrogen), a mixture thereof, etc.) from the piping of a fire suppression sprinkler system while a new inert gas (e.g., pure nitrogen) is supplied into the system. Additionally, the valve systems and assemblies may be configured to measure the content level of a specific gas (e.g., nitrogen or oxygen) within the mixture of gasses (e.g., a mixture of air and nitrogen) in the fire suppression sprinkler system.

Venting (i.e., purging) the gas or mixture of gasses (e.g., a mixture of air and nitrogen, which is itself a mixture of oxygen and nitrogen) from the fire suppression while adding a pure gas (e.g., purified nitrogen) allows for a predetermined concentration of the desired gas (e.g., nitrogen) to be obtained. In this manner, nitrogen may be supplied while venting a nitrogen/air mixture so that the resulting gas within the fire suppression sprinkler system possesses a desirable nitrogen concentration (e.g., somewhere between 85%-99%). Corrosion of the system may thereby be prevented.

In some embodiments, the nitrogen supply and the venting of the air/nitrogen mixture may be executed manually while using a nitrogen analyzer that quickly and easily connects to the valve assembly that vents the air/nitrogen mixture. This arrangement allows for a relatively simple and inexpensive way to raise the nitrogen content of the gas in the fire suppression sprinkler system to a predetermined (i.e., desired) value.

The disclosed valve assembly may be compact to minimize the volume of the piping system, which may improve the maintenance accessibility of the valve assembly and allow for improved installation of the system (e.g., arrangement concerns are improved). The disclosed valve assembly includes several alternative embodiments to facilitate reliable venting and measuring the nitrogen content in a variety of ways.

Depending on implementation, the devices described herein may conform to the requirements of National Fire Protection Association Standard 13 (NFPA 13). These devices also may be UL and/or FM compliant. The scope of the appended claims directed to the valve assembly and method disclosed in this application, however, are not limited to conforming with any particular standards or requirements.

Figure 1:
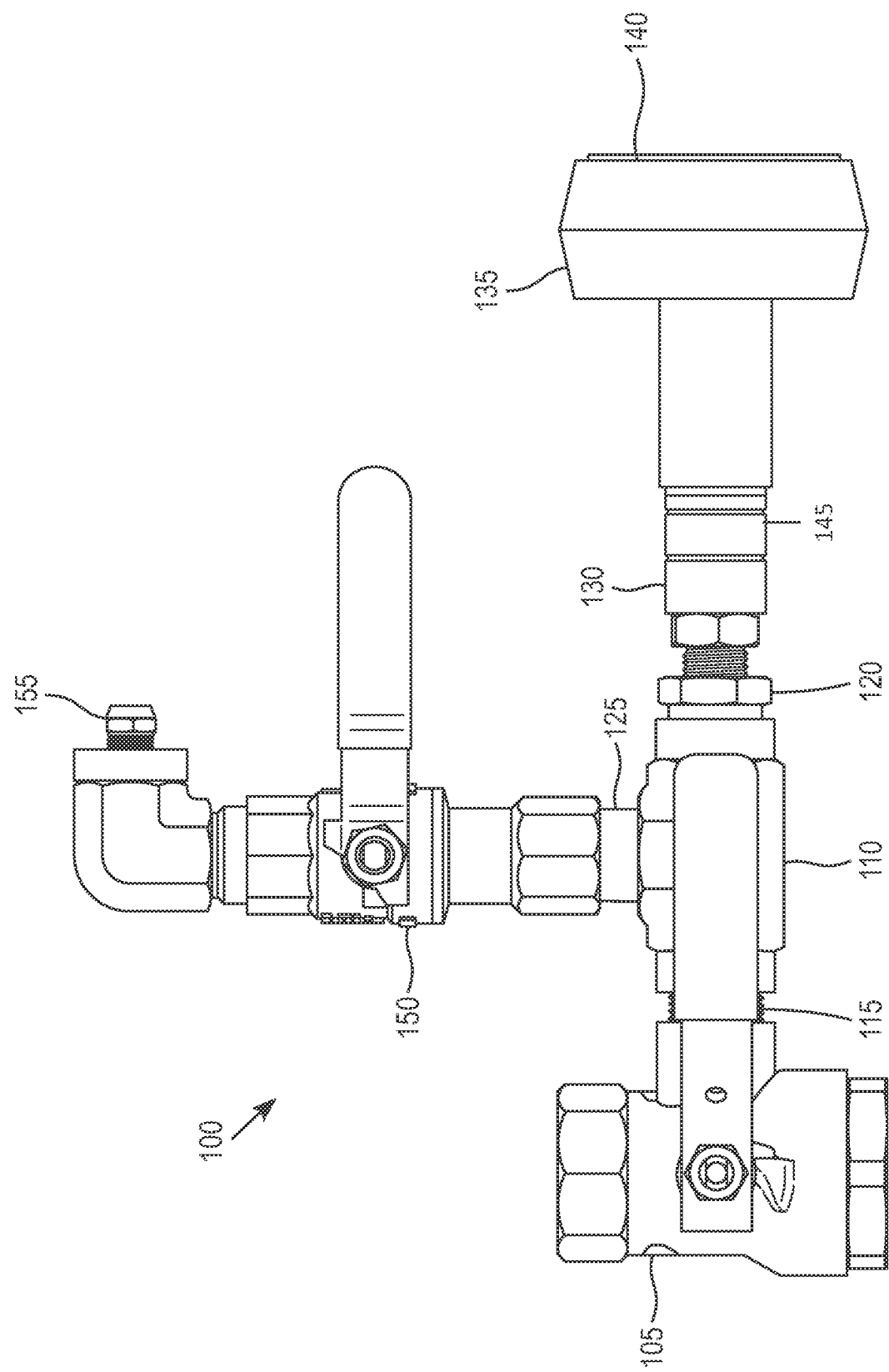
FIG. 1 illustrates a side view of a valve assembly according to an embodiment of the disclosure.

FIG. 1 depicts an exemplary valve assembly 100 suitable for being connected to the inspector's test valve 105 of a fire suppression sprinkler system. The inspector's test valve 105 often is disposed at an end of the line in the piping network of the fire suppression sprinkler system. This placement of the inspector's test valve 105 is because the pressure readings, water purity, etc. at the far end of the fire suppression sprinkler system may give the most conservative measurements. By configuring the valve assembly 100 to connect (e.g., thread into an open port) to the inspector's test valve 105, readings of any discharged gas also may be more accurate and/or conservative because the gas readings are not being taken near where fresh gas (e.g., nitrogen) is being supplied into the piping system. The inspector's test valve 105 illustrated in FIG. 1 is Model 3011, "InspectorsTEST", by AGF Manufacturing, Inc.® The inspector's test valve 105 may include an approved orifice, which is equal to that of the smallest orifice sprinkler installed in the system.

Valve assembly 100 may include a pipe fitting 110 that is configured to connect to (e.g., thread onto/into) a perpendicular outlet port of the inspector's test valve 105. FIG. 1 depicts a t-shaped pipe fitting 110, although the pipe fitting 110 could be any other type of pipe fitting (other non-limiting examples are discussed below) or adapter. The pipe fitting 110 includes an inlet 115, a first outlet 120, and a second outlet 125. The inlet 115 of the pipe fitting screws into the perpendicular outlet port of the inspector's test valve 105 as shown in FIG. 1. Gas and/or fluid may thus flow from the fire suppression sprinkler system into the interior of the pipe fitting 110.

Figure 2:
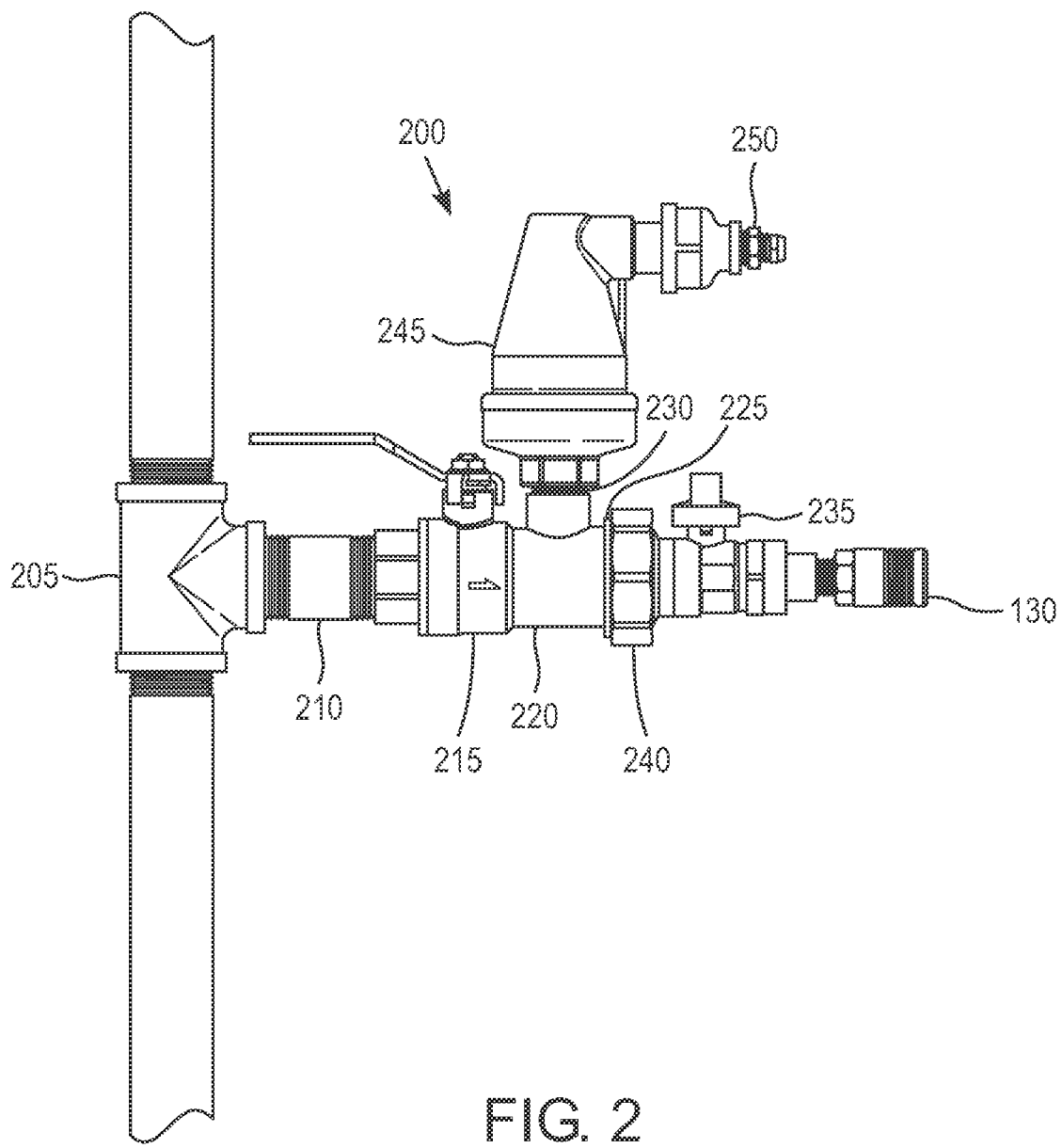
FIG. 2 illustrates a side view of a valve assembly according to an embodiment of the disclosure.

The first outlet 120 of the pipe fitting 110 may be positioned directly opposite the inlet 115 as shown in FIG. 1. The first outlet 120 of the pipe fitting 110 may be connected to a quick-disconnect fitting 130 (also known as a quick-disconnect or a quick-disconnect coupling). Quick-disconnect fittings such as the quick-disconnect fitting 130 illustrated in FIG. 1 are well known and facilitate a reliable and easy connection method. The quick-disconnect fitting 130 may prevent the flow of gas therethrough when the end of the quick-disconnect fitting 130 on the opposite side of the outlet 120 of the pipe fitting 110 is free (i.e., not connected to anything as shown in FIG. 2).

FIG. 1 illustrates that the inlet of a nitrogen analyzer 135 is connected to the quick-disconnect fitting 130. The nitrogen analyzer 135 typically may be only attached to the quick-disconnect fitting 130 when a user desires to test the nitrogen content of the gas flowing through the fire suppression sprinkler system. For example, the user may wait to connect the nitrogen analyzer 135 until after a predetermined amount of nitrogen charging time (while venting the residual air/nitrogen mixture) has elapsed. This procedure thus allows the user to confirm that the target nitrogen content has been obtained in the fire suppression sprinkler system. In some alternative embodiments, the nitrogen analyzer 135 may be permanently connected to the pipe fitting 110 (e.g., via the quick-disconnect fitting 135, via another adapter, or directly).

Examples of nitrogen analyzers 135 that may be used include, but are not limited to, the Handi$^+$N$_2$ (R218P05) and the MaxN$_2$$^+$AE (R217P66) manufactured by Maxtec®. These nitrogen analyzers are compact and portable, allowing for easy and efficient connection to the quick-disconnect fitting 130. One of ordinary skill in the art, however, will recognize that other nitrogen analyzers may be selected, as appropriate. See e.g., EP 1988385 issued to Naoho Baba.

The nitrogen analyzer 135 may be comprise a display 140 to visually inform the user of the nitrogen content of the gas that flows into the nitrogen analyzer 135. Some embodiments of the nitrogen analyzer 135 may include a visual (examples discussed further below) and/or audio alarm to alert the user when a specific nitrogen content level is obtained. For example, some users may place a great importance on maintaining a corrosion-free environment in the piping network, and so a nitrogen content of 98% or 99% or more may be desired. Other users may prefer to conserve energy (e.g., used to run the nitrogen generator) and/or bottled nitrogen, and so a lower predetermined nitrogen content may be preferred, for example, 80%, 85%, 90%, or 92%. However, the predetermined target level of nitrogen in the gas in the fire suppression sprinkler system is not limited to any specific level of nitrogen, such as the exemplary amounts enumerated here. The visual or audio alarm could alert the user when the predetermined nitrogen content is reached.

The display 140 may be a digital display, such as a Liquid Crystal Display (LCD) or a display using Light Emitting Diodes (LEDs). A digital display 140 may inform a user (e.g., an operator of the system) of the nitrogen content in the gas analyzed by the nitrogen analyzer 135. In some embodiments, the digital display 140 may provide a very precise reading (e.g., including two or more decimal places) and in other embodiments the digital display 140 may provide a less precise reading (e.g., including one or no decimal places).

In some embodiments, the display 140 may be configured to light up or emit colored light to signal the nitrogen content. For example, predetermined nitrogen content levels could be programmed into the nitrogen analyzer so that the display 140 lights up certain colors based on the nitrogen content. One more specific example could be that the display 140 lights up red when the nitrogen content is below a first predetermined value (e.g., 85%), lights up yellow when the nitrogen content is above the first predetermined value (e.g., 85%) but below a second predetermined value (e.g., 98%), and lights up green when the nitrogen content is above the second predetermined value (e.g., 98%). However, the colors and the nitrogen levels are certainly not limited to any specific colors or percentages, respectively.

By providing a colored visual indication that reflects the nitrogen content, the user may be able to determine whether an appropriate nitrogen level has been reached without needing to read a digital display (e.g., the user could be much farther away from the nitrogen analyzer 135). In some embodiments, the display 140 could provide both a digital reading and a colored visual indication, and in other embodiments the display 140 could be configured to provide only one of the digital reading and colored visual indication. The audio alarm mentioned above could also be used in conjunction or in place of the visual indications discussed here.

Figure 3A:
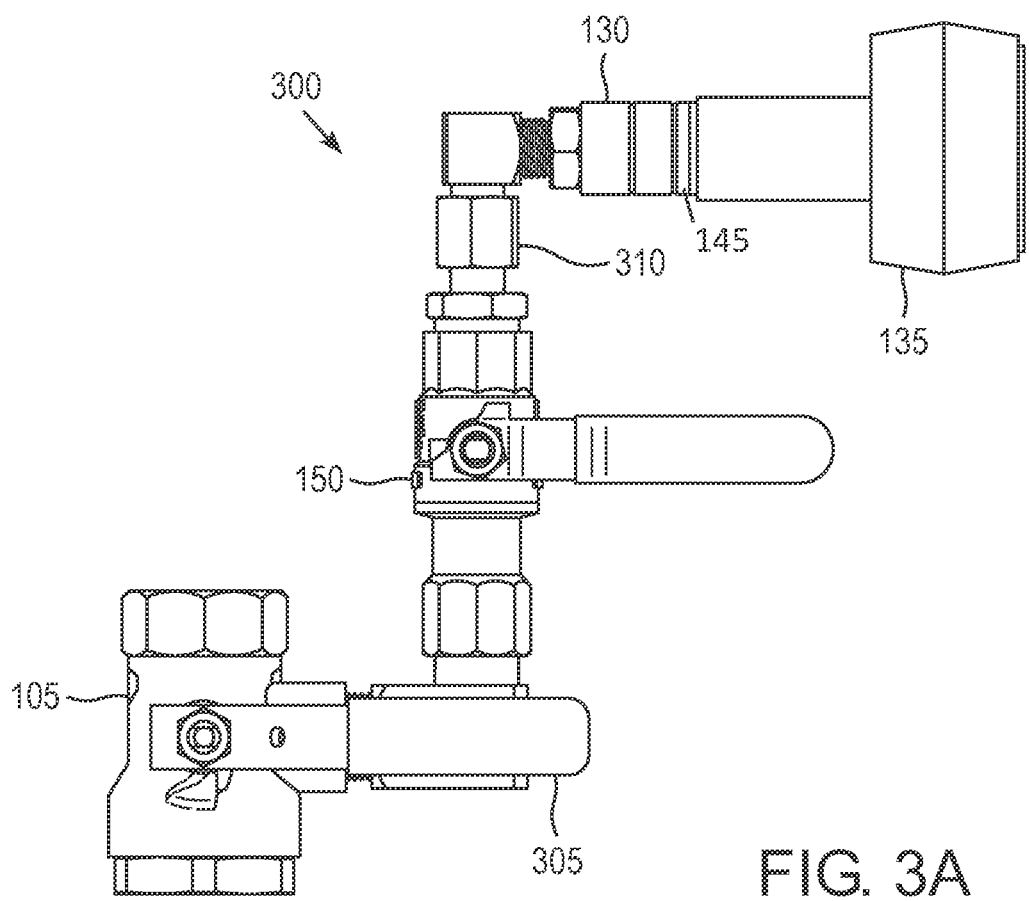
FIG. 3A illustrates a side view of a valve assembly according to an embodiment of the disclosure and FIG. 3B illustrates a perspective view of the valve assemble shown in FIG. 3A.
Figure 3B:
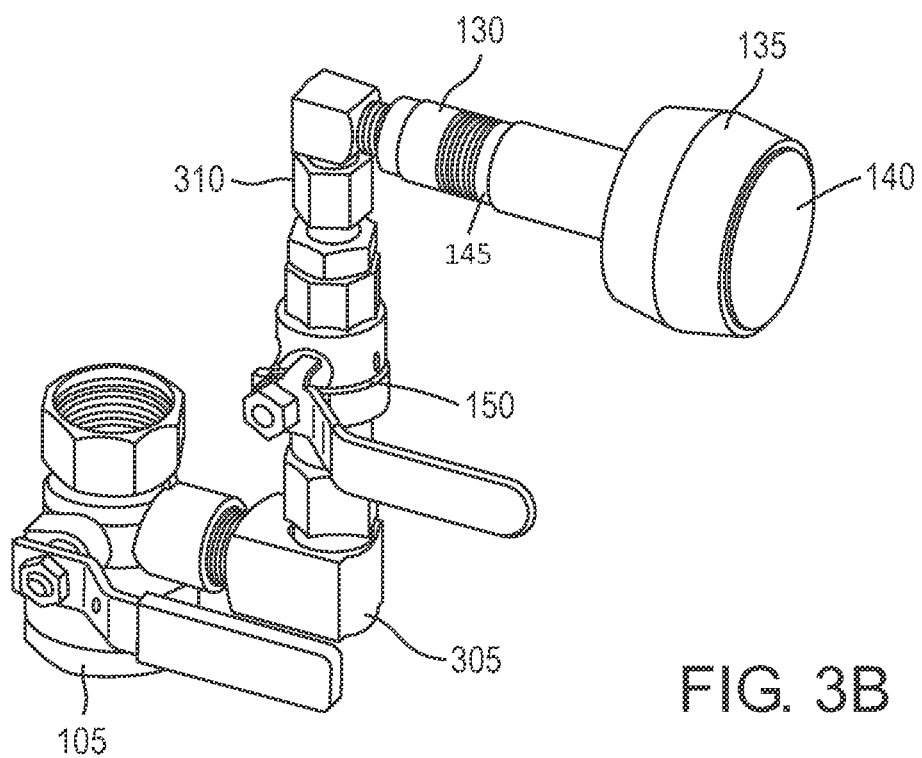
Figure 4:
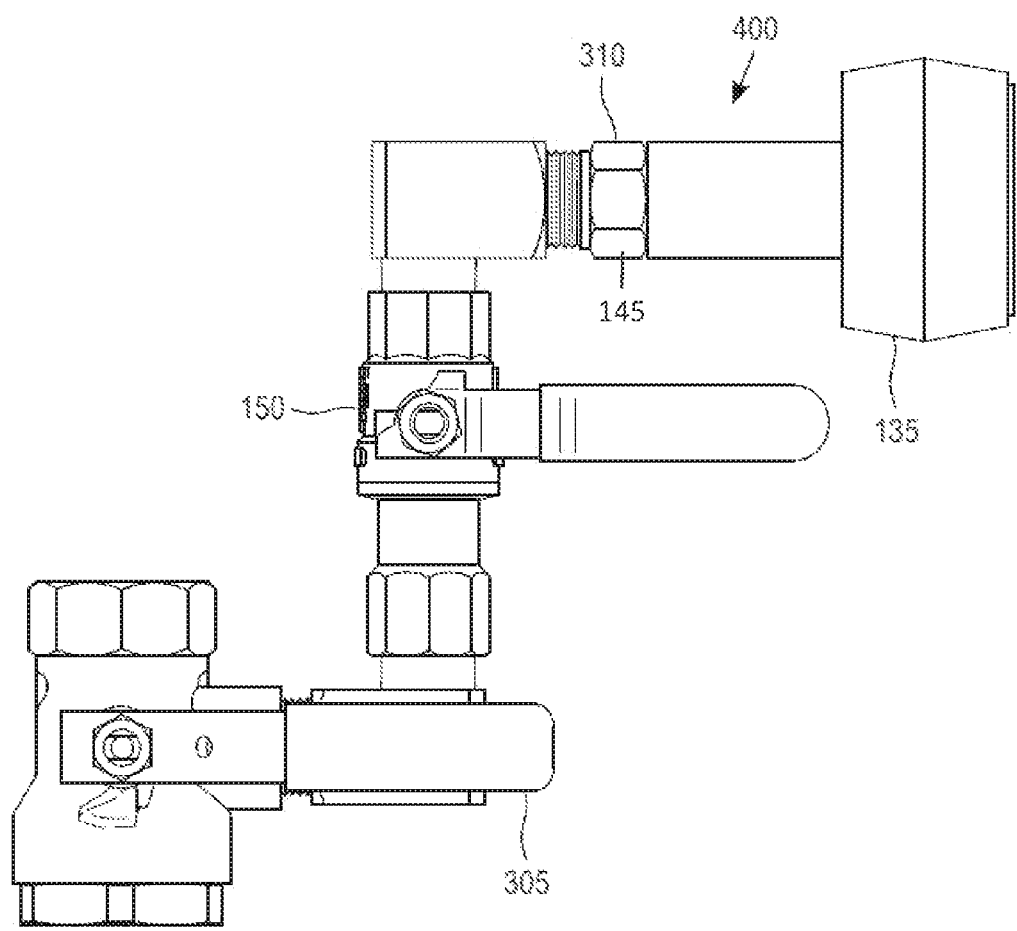
FIG. 4 illustrates a side view of a valve assembly according to an embodiment of the disclosure.

In some embodiments, the nitrogen analyzer 135 may include one or more vent ports 145 to allow the gas to be discharged to the outside environment as the nitrogen content is being measured by the nitrogen analyzer 135. For example, a vent port 145 may be positioned in front of the sensor of the nitrogen analyzer 135 (i.e., the sensor in the nitrogen analyzer 135 that measures the nitrogen content of the gas), so that the sensor can measure the nitrogen content of gas flowing in front of the sensor. More specifically, a vent port 145 may be in the outer circumferential wall of the quick-disconnect fitting 130. FIGS. 3A-4 (discussed below) illustrate examples of a vent port 145 at this location. Two or more vent ports 145 may also be provided in some embodiments. For example, two vent ports 145 may be diametrically opposite one another (i.e., spaced 180° apart) on the outer wall of the quick-disconnect fitting 130. In yet another embodiment, the vent port(s) 145 could be in the upstream side of the thinner diameter portion of the nitrogen analyzer 135 and/or could be at another location in the valve assembly 100 upstream of the nitrogen analyzer 135. Other embodiments of the nitrogen analyzer 135 may not include any vent ports 145. For example, the nitrogen analyzer 135 in the valve assembly 100 illustrated in FIG. 1 may not include any vent ports 145 and can instead vent through the discharge orifice 155 (discussed below). In the various configurations discussed above, the gas venting may thus occur in front of the sensor of the nitrogen analyzer 135.

FIG. 1 also illustrates that a vent valve 150 may be connected to the second outlet 125 of the pipe fitting 110. The vent valve 150 may be a manually operated ball valve, as shown in FIG. 1. In other embodiments, the vent valve 150 may be a different type of valve, such as a float valve (described below regarding FIG. 2), a butterfly valve, a check valve, a gate valve, a globe valve, a needle valve, etc.

The vent valve 150 may be manual in some embodiments or could be an automatic valve in other embodiments. For example, the vent valve 150 could be an electromechanical valve, such as a solenoid valve 150, which automatically opens/shuts based on receiving an electric signal. When an electromechanical valve is used as the vent valve 150, the vent valve 150 could be configured to be an automatically shutting valve. That is, when the nitrogen analyzer 135 detects that the nitrogen content of the gas flowing therethrough has reached a predetermined nitrogen content (e.g., 98%), the nitrogen analyzer 135 could send a signal to the solenoid valve to automatically shut the vent valve 150. In this configuration, an audio and/or visual alarm should likely be simultaneously provided by the nitrogen analyzer 135, so that the user knows to stop the supply of pure nitrogen into the fire suppression sprinkler system.

As noted above, in the embodiment illustrated in FIG. 1, the vent valve 150 is a manually operated ball valve that is operable to move between an open position (allowing flow therethrough) and a closed position (preventing flow therethrough). The outlet of the vent valve 150 of FIG. 1 is connected to an angled discharge orifice 155. The discharge orifice 155 discharges gas (e.g., a nitrogen and air mixture) to the outside environment. The outlet diameter of the discharge orifice 155 may be appropriately selected so that the discharge rate of the gas is the same (or substantially the same) as the rate of supplying pure nitrogen into the system.

The orientation illustrated in FIG. 1 shows that the t-shaped pipe fitting 110 connects directly upward to the inlet of the vent valve 150 and that the discharge orifice 155 is angled to discharge gas at a 90° relative to the upwardly-extending vent valve 150. This arrangement beneficially allows for a compact arrangement of these components. Other arrangements, however, are certainly included within the scope of the present disclosure. For example, the discharge orifice 155 may discharge the gas directly upwards. In other embodiments, the nitrogen analyzer 135 could be connected to the second outlet 125 of the pipe fitting 110 (e.g., via the quick-disconnect fitting 130, via another type of adapter or fitting, or directly), and the vent valve 150 could be connected to the first outlet 120 of the pipe fitting 110.

FIG. 2 illustrates another embodiment of a valve assembly 200 disclosed in this application. The valve assembly 200 is illustrated as connected to a t-shaped fitting 205 in the piping network of the fire suppression sprinkler system. The valve assembly 100 illustrated in FIG. 1 could also be connected to any other outlet port of the piping network (such as a t-shaped fitting 205), and similarly, the valve assembly 200 illustrated in FIG. 2 could be connected to the inspector's test valve 105, which has been discussed above.

The valve assembly 200 illustrated in FIG. 2 may include a pipe adapter 210 that threadedly-engages with the outlet port of the t-shaped fitting 205 in the piping network of the fire suppression sprinkler system. The opposite end of the pipe adapter 210 may be connected to a vent valve 215. The vent valve 215 may be a manually operated ball valve that is operable to move between an open position (allowing flow therethrough) and a closed position (preventing flow therethrough). The vent valve 215 could alternatively be a different type of valve, such as one of the valves mentioned above. A vent screen 220 may be located internally within the vent valve 215, for example, at the location indicated in FIG. 2. The vent screen 220 may help prevent debris from reaching and blocking the discharge orifice 250.

The vent valve 215 may include a first outlet 225 and a second outlet 230. The first outlet 225 is illustrated in FIG. 2 to be connected to a sampling valve 235 via a connecting nut 240. The sampling valve 235 and/or the connecting nut 240 may not be included in some embodiments. The sampling valve 235 may facilitate a connection to a nitrogen analyzer 135. FIG. 2 also illustrates that a quick-disconnect fitting 130 may be connected to the outlet of the sampling valve 235. A nitrogen analyzer 135 may connect directly to the quick-disconnect fitting 130 as described above (e.g., the nitrogen analyzer 135 illustrated in FIG. 1).

The second outlet 230 of the vent valve 215 may be connected (e.g., threaded into) to an air release valve 245. The air release valve 245 may be an automatic air release float valve that includes a float and a seat in the interior of the valve, with the air release valve 245 configured such that air can flow through the air release valve 245 to a discharge orifice 250 to be released to the outside environment. If a fluid (e.g., water) is introduced into the air release valve 245, however, the float will seat against the seat of the valve to prevent water from being discharged from the discharge orifice 250. The air release valve 245 shown in FIG. 2 has an angled discharge path to the discharge orifice 250; however, some embodiments may include alternative configurations/arrangements.

FIG. 3A illustrates the side view of another embodiment of a valve assembly 300 disclosed in this application. FIG. 3B provides a perspective view of the valve assembly 300. The valve assembly 300 is shown to be connected to the inspector's test valve 105, but the valve assembly 300 could alternatively be connected to another outlet port of the fire suppression sprinkler system, e.g., as illustrated in FIGS. 2 and 5A-7B.

The valve assembly 300 includes an L-shaped pipe fitting 305 that is connected (e.g., threadedly-engaged) to the outlet of the inspector's test valve 105. The L-shaped pipe fitting 305 is illustrated for exemplary purposes; however, any other type of pipe fitting may be used depending on the desired arrangement and orientation of the valve assembly 300.

The outlet end of the L-shaped pipe fitting 305 is connected to the inlet of a vent valve 150. This vent valve 150, and the possible alternate embodiments of this vent valve 150, is discussed above in relation to FIG. 1, and so repeated discussion is not warranted. In the illustrative embodiment of FIGS. 3A and 3B, the vent valve 150 is a manually-operated ball valve. The use of a manually-operated ball valve may allow for an inexpensive and straightforward system design that is easy to operate by the end user.

The outlet side of the vent valve 150 may be connected to an orifice adapter 310. The orifice adapter 310 may contain a flow orifice to control the rate of system venting (e.g., similar to discharge orifice 155 and/or discharge orifice 250). In other embodiments, other adapters/pipe fittings may be used instead of (or in addition to) the orifice adapter 310 depending on the nominal pipe diameters needed and/or the desired arrangement. The downstream side of the orifice adapter 310 of FIGS. 3A and 3B is connected to an elbow so that the outlet connection is oriented at 90° relative to the inlet of the orifice adapter 310.

The outlet of the orifice adapter 310 may be connected to a quick-disconnect fitting 130. However, another pipe fitting may be used in addition or instead of the quick-disconnect fitting 130. In another embodiment, the nitrogen analyzer 135 may be secured directly to the orifice adapter 310.

FIGS. 3A and 3B illustrate that the nitrogen analyzer 135 is connected directly to the quick-disconnect fitting 130. The nitrogen analyzer 135 may be permanently connected, so that it remains in place throughout the operation of the fire suppression sprinkler system. The nitrogen analyzer 135 of the embodiment illustrated in FIGS. 3A and 3B may include at least one vent port 145. The nitrogen analyzer 135 may also include the display 140 or any of the other exemplary features discussed above regarding aspects of the nitrogen analyzer 135. At least one vent port 145 is needed in this embodiment, however, to allow the gas to flow in front of the sensor of the nitrogen analyzer 135 and to be discharged to the outside environment. The vent port 145 may be located towards the upstream side of the nitrogen analyzer 135, in the outer circumferential wall of the quick-disconnect fitting 130 as shown in FIGS. 3A and 3B. In another embodiment, the nitrogen analyzer 135 may have a vent screen (e.g., a mesh screen) that includes a plurality of vent ports 145. The embodiment illustrated in FIGS. 3A and 3B, however, includes a vent screen that is internal within the valve assembly 300, upstream of the nitrogen analyzer 135. This vent screen might be installed at the inlet of the vent valve 150 and/or the orifice adapter 310. A single vent screen or multiple vent screens can be used in the valve assembly 300.

At least one vent port 145, however, may be provided in another location in the valve assembly 300 (i.e., upstream of the nitrogen analyzer 135). For example, in some embodiments, the orifice adapter 310 may include a vent port 145, such as a radial vent hole (i.e., a vent hole drilled into the orifice adapter 310). At least one vent port 145 may be provided in any other component of the valve assembly 300 upstream of the nitrogen analyzer 135 and downstream of the orifice adapter 310. For another example, the quick-disconnect fitting 130 could include at least one vent port 145. The upstream vent port 145 may be connected to a hose adapter. A vent hose may be utilized to provide a venting location as desired. The vent hose may be detachably connected to the vent port 145, and the vent hose could be removed when venting is not required (e.g., when the vent valve 150 is closed). More than one vent port 145 may be provided, as discussed above.

One modification of the embodiment shown in FIGS. 3A and 3B is shown in FIG. 4. In this embodiment, the orifice adapter 310 is directly connected to the nitrogen analyzer 135 (i.e., there is no quick-disconnect fitting 130). The arrangement of the valve assembly 400 shown in FIG. 4 may be used for a permanently installed nitrogen analyzer 135. The orifice adapter 310 may include a radial vent hole drilled into the orifice adapter 310, or the valve assembly 400 shown in FIG. 4 may include at least one vent port 145 similar to any of the embodiments discussed above. The other aspects and variations of the valve assembly 400 shown in FIG. 4 may be similar to the aspects discussed above, and so repeated discussion is not warranted.

The discussion above is generally in relation to connecting the various embodiments of valve assemblies to an inspector's test valve 105. In some fire suppression sprinkler systems, however, there may not be an inspector's test valve 105. For example, NFPA 13 (i.e., a standard for the installation of sprinkler systems by the National Fire Protection Association) does not require an inspector's test valve in dry fire suppression systems of 500 gallons and smaller. An auxiliary drain, however, is required for all isolated trapped sections of system piping that are more than five gallons in capacity. Therefore, FIGS. 5A-7B relate to embodiments involving valve assemblies (such as those discussed above) to an auxiliary drain.

Figure 5A:
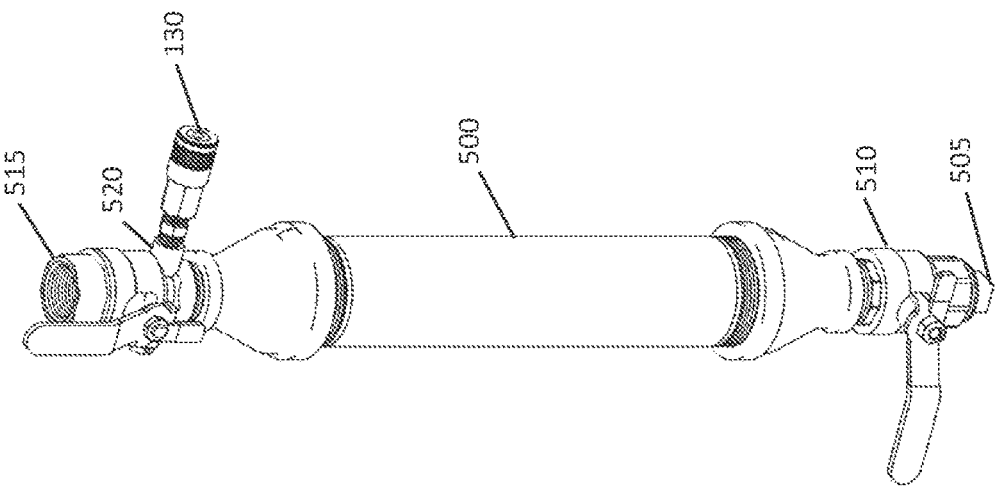
FIG. 5A illustrates a front view of an auxiliary drain with a side-ported inlet valve and FIG. 5B illustrates a perspective view of the auxiliary drain shown in FIG. 5A.
Figure 5B:
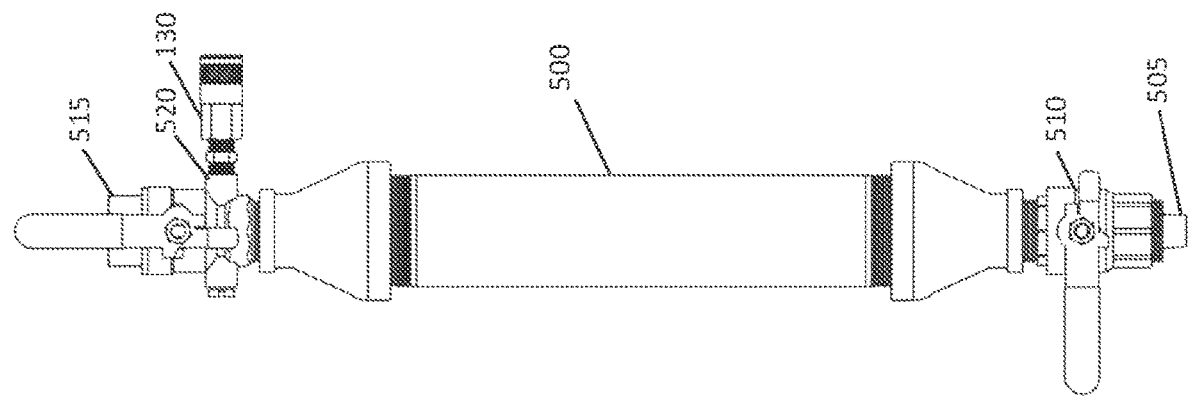

FIGS. 5A and 5B illustrate an embodiment of an auxiliary drain 500. The auxiliary drain 500 may be, for example, the model 5300A "COLLECTanDRAIN" auxiliary drain product manufactured by AGF Manufacturing Inc.®. However, the auxiliary drain 500 is not limited to any specific drain product.

The auxiliary drain 500 includes a drain port 505 that can be used to drain any isolated trapped sections of system piping (e.g., sections of more than five gallons in capacity). The auxiliary drain 500 may include a drain valve 510. The drain valve 510 may be a manually operated ball valve that can be opened to drain any liquid and/or moisture from the drain port 505 (e.g., by utilizing the force of gravity). The drain valve 510 is not limited to being a ball valve, however, and can be any other type of valve. The drain valve 510 is also not limited to being manually operated, and could be any type of automatic or semi-automatic valve.

FIGS. 5A and 5B illustrate that the auxiliary drain 500 may include a side-ported inlet valve 515. The side-ported inlet valve 515 of the auxiliary drain 500 may include a threaded connection, as shown in FIG. 5B, to connect to a section of piping (e.g., at a low-point) of the fire suppression system to allow liquid and/or moisture to drain through the side-ported inlet valve 515 to the drain port 505. The side-ported inlet valve 515 may include a side port 520 (i.e., an angled outlet). The side port 520 may extend at an angle (e.g., 90°) relative to the flow path of the auxiliary drain.

FIGS. 5A and 5B illustrate that a quick-disconnect fitting 130 may be connected to the side port 520 of the auxiliary drain 500. The quick-disconnect fitting 130 may be detachably connected to a nitrogen analyzer 135 as described above or as illustrated, for example, in FIG. 1.

Figure 6B:
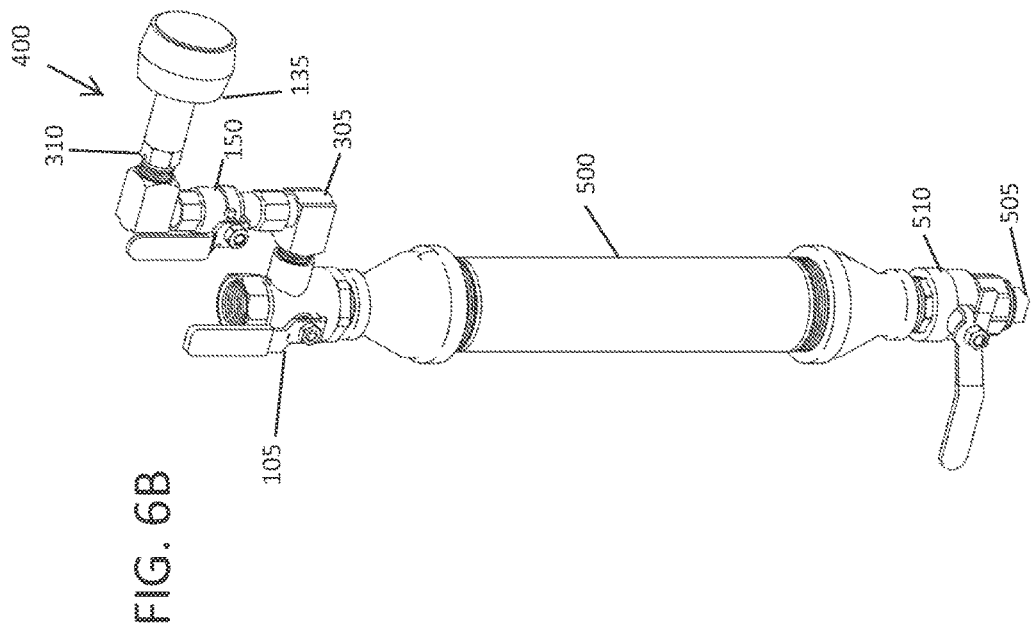
FIG. 6B illustrates a perspective view of the auxiliary drain shown in FIG. 6A.
Figure 6A:
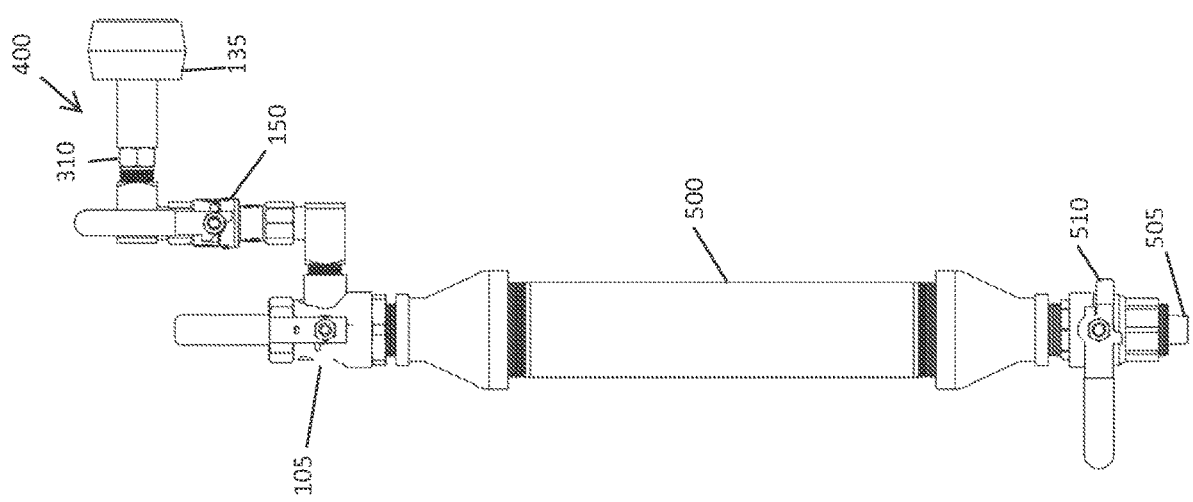
FIG. 6A illustrates a front view of an auxiliary drain connected to the valve assembly shown in FIG. 4.

FIGS. 6A and 6B illustrate another example of the auxiliary drain 500 connected to the inspector's test valve 105, which is connected to a valve assembly such as those described above (i.e., an assembly configured to vent gas and detect inert gas content). FIGS. 6A and 6B more specifically show the perpendicular outlet port of the inspector's test valve 105 being connected to the valve assembly 400 (e.g., as shown in FIG. 4). The description of the valve assembly 400 does not warrant repetition, but FIGS. 6A and 6B are provided to illustrate that the inspector's test valve 105 may be connected to both the auxiliary drain 500 and to the L-shaped pipe fitting 305 of the valve assembly 400.

Figure 7B:
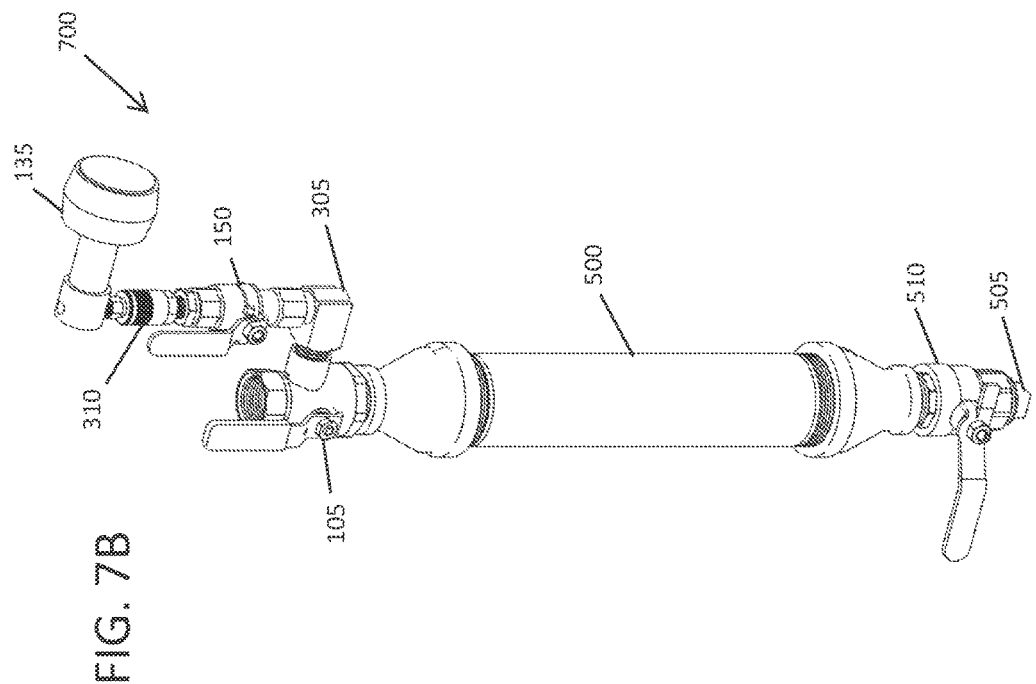
FIG. 7B illustrates a perspective view of the auxiliary drain shown in FIG. 7A.
Figure 7A:
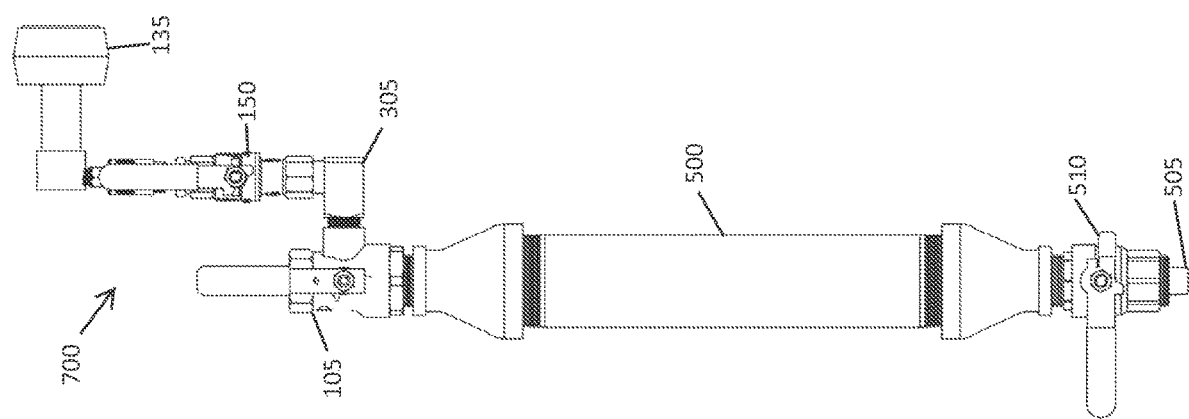
FIG. 7A illustrates a front view of an auxiliary drain connected to a valve assembly similar to that shown in FIG. 3A.

FIGS. 7A and 7B illustrate yet another example of the inspector's test valve 105 being connected to both the auxiliary drain 500 and a valve assembly (i.e., an assembly configured to detect the nitrogen content of the system). More specifically, FIGS. 7A and 7B illustrate the inspector's test valve 105 connected to a valve assembly 700. The valve assembly 700 is a variation of the vent assembly 300 illustrated in FIGS. 3A and 3B. The valve assembly 700 includes an L-shaped pipe fitting 305 that is threadedly connected to the perpendicular outlet port of the inspector's test valve 105. The valve assembly 700 may include a vent valve 150, an orifice adapter 310, and a nitrogen analyzer 135. Examples of these components are discussed above, and so repetition of this discussion is not warranted.

Much of the above discussion involves supplying pure nitrogen into a fire suppression sprinkler system to expel residual air using the vent assembly. However, the valve assembly could also be used in other piping systems to vent/measure other gasses besides nitrogen, oxygen, and/or air.

While various exemplary embodiments of the disclosed valve assembly, valve system, and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A valve assembly comprising:
   a pipe fitting through which a gas is configured to flow, the pipe fitting comprising an inlet, a first outlet, and a second outlet, the inlet of the pipe fitting being configured to connect to an open port of a fire suppression sprinkler system so that the gas flows from the fire suppression sprinkler system into the pipe fitting and out through the first and second outlets of the pipe fitting;
   an inert gas analyzer connected to the first outlet of the pipe fitting, the inert gas analyzer being positioned so that the gas flowing from the first outlet of the pipe fitting passes in front of the inert gas analyzer, the inert gas analyzer being configured to measure an inert gas content of the gas flowing in front of the inert gas analyzer;
   a vent valve comprising an inlet and an outlet, wherein the second outlet of the pipe fitting is upstream of the inlet of the vent valve, is upstream of the first outlet of the pipe fitting, and connects directly upward to the inlet of the vent valve, the vent valve being operable to move between an open position and a shut position; and
   a discharge orifice connected to the outlet of the vent valve, the discharge orifice discharging the gas to the outside environment when the vent valve is in the open position.

2. The valve assembly of claim 1, wherein the inert gas is nitrogen.

3. The valve assembly of claim 1, wherein the inlet of the pipe fitting is configured to thread into an inspector test valve of the fire suppression sprinkler system.

4. The valve assembly of claim 1, wherein the inert gas analyzer is connected to the first outlet of the pipe fitting via a quick-disconnect fitting.

5. The valve assembly of claim 4, wherein the quick-disconnect fitting comprises at least one vent port.

6. The valve assembly of claim 1, wherein the inert gas analyzer comprises a display configured to visually identify the inert gas content of the gas flowing in front of the inert gas analyzer.

7. The valve assembly of claim 2, wherein the inert gas analyzer comprises at least one of an audio alarm and a visual alarm that provides an alert when a nitrogen content of the gas flowing in front of the inert gas analyzer reaches a predetermined content.

8. The valve assembly of claim 7, wherein the predetermined nitrogen content is 98% nitrogen.

9. The valve assembly of claim 1, wherein the vent valve is a manually-operated ball valve.

10. The valve assembly of claim 1, wherein the vent valve is a float valve configured to automatically shut when water flows into the float valve.

11. The valve assembly of claim 1, wherein the vent valve is a solenoid valve.

12. The valve assembly of claim 11, wherein the inert gas analyzer communicates with the vent valve so that the vent valve automatically moves to the shut position when the inert gas analyzer detects that the inert gas content of the gas flowing in front of the inert gas analyzer has reached a predetermined inert gas content.

* * * * *